Aug. 4, 1964

W. A. LEET ETAL

3,143,716

TWO-BAND CAVITY TUNER UTILIZING MOVABLE SHAPED PLUNGER
FOR TUNING WITHIN BANDS AND CAVITY SHORTING
SWITCH FOR BRIDGING BANDS

Filed Dec. 16, 1959

INVENTORS
WILLIAM A. LEET,
ROBERT F. MORRISON, JR.
BY AND ERIC W. MOULTON

ATTORNEY.

Aug. 4, 1964  W. A. LEET ETAL  3,143,716
TWO-BAND CAVITY TUNER UTILIZING MOVABLE SHAPED PLUNGER
FOR TUNING WITHIN BANDS AND CAVITY SHORTING
SWITCH FOR BRIDGING BANDS
Filed Dec. 16, 1959  7 Sheets-Sheet 4

INVENTORS
WILLIAM A. LEET,
ROBERT F. MORRISON, JR.
BY AND ERIC W. MOULTON

ATTORNEY

Aug. 4, 1964 W. A. LEET ETAL 3,143,716
TWO-BAND CAVITY TUNER UTILIZING MOVABLE SHAPED PLUNGER
FOR TUNING WITHIN BANDS AND CAVITY SHORTING
SWITCH FOR BRIDGING BANDS
Filed Dec. 16, 1959 7 Sheets-Sheet 5

INVENTORS
WILLIAM A. LEET,
ROBERT F. MORRISON, JR.
BY AND ERIC W. MOULTON

ATTORNEY.

Aug. 4, 1964

W. A. LEET ETAL 3,143,716

TWO-BAND CAVITY TUNER UTILIZING MOVABLE SHAPED PLUNGER
FOR TUNING WITHIN BANDS AND CAVITY SHORTING
SWITCH FOR BRIDGING BANDS

Filed Dec. 16, 1959

INVENTORS
WILLIAM A. LEET,
ROBERT F. MORRISON, JR.
BY AND ERIC W. MOULTON

ATTORNEY 3,143,716
TWO-BAND CAVITY TUNER UTILIZING MOVABLE SHAPED PLUNGER FOR TUNING WITHIN BANDS AND CAVITY SHORTING SWITCH FOR BRIDGING BANDS
William A. Leet, Pittsford, and Robert F. Morrison, Jr., Rochester, N.Y., and Eric W. Moulton, Cincinnati, Ohio, assignors to General Dynamics Corporation, Rochester, N.Y., a corporation of Delaware
Filed Dec. 16, 1959, Ser. No. 859,912
10 Claims. (Cl. 333—73)

The present invention relates generally to a new and improved preselector for use in the high frequency stages of receiving equipment and is more particularly concerned with a new and improved arrangement for controlling the tuning of one or more preselector cavities which are adapted to be tuned through at least two spaced apart frequency bands.

The preselector of the present invention is well suited for use in air navigation systems known as tacan as described on pages 521 to 557 of the text "Electronic Avigation Engineering" by Peter C. Sandretto published in 1958 by the International Telephone and Telegraph Corporation. In systems of this type energy is transmitted in a band of frequencies extending from 1025 to 1150 megacycles while the signals received from ground responding stations fall within two different receiving bands lying respectively above and below the transmitting band. The receiving equipment employs 126 channels spaced one magacycle apart and, hence, the first receiving band containing channels 1 to 63 covers a frequency range from 962 to 1024 megacycles. The second receiving band contains channels 64 to 126 and covers a frequency range from 1151 to 1213 megacycles.

In order to provide the necessary selectivity between received signals it is necessary to provide filters, known as preselectors, between the aircraft antenna and the mixing and intermediate frequency amplifying stages of the receiver. These preselectors take the form of a set of quarter-wavelength resonant cavities connected in series with at least two such cavities generally being necessary to attain the desired selectivity. Prior to the present invention, it has been the practice to provide one pair of preselector cavities for each receiving band. Each pair of cavities is tuned continuously through the band which it covers and the two cavities not in use are rendered ineffective by short-circuiting their center elements. Thus, as the receiver is tuned through its entire range from channel 1 to channel 126, the first pair of cavities is tuned in sequence from channel 1 to channel 63 but during this period the second pair of cavities is rendered ineffective by the short-circuiting referred to above. As the receiver is tuned from channel 63 to channel 64 the short circuit is removed from the second pair of cavities and the first pair of cavities is short-circuited. Thereafter, as the receiver is tuned from channel 64 to channel 126 the second pair of cavities is tuned through the second receiving band. The described arrangement thus requires at least four preselector cavities and a complex short-circuiting arrangement. This large number of cavities not only consumes a great deal of space and adds to the weight of the equipment, factors which are of paramount importance in airborne equipment, but it also increases the construction cost of the apparatus.

It would, of course, be desirable to provide the necessary selectivity without using such a large number of tuned cavities and the satisfaction of this desire, therefore, constitutes one of the principal objects of the present invention.

A further and more general object of the invention is to provide an effective preselector which requires considerably less space and which is much lighter in weight than prior devices of this nature.

Another and more specific object of the invention is to provide a new and improved preselector including a cavity tunable through two spaced apart receiving bands with provision being made for jumping the tuning of the cavity in passing from one band to the other.

The invention has for a further object the provision of a new and improved preselector of the character indicated above wherein the jump in tuning of the cavity is effected by causing an abrupt change in the effective impedance of at least one of the elements of the cavity circuit as the tuning is shifted from one receiving band to the other.

A further object of the invention is to provide a new and improved preselector employing a tunable cavity which is tuned very linearly through its range.

Another object of the invention is to provide a cavity which is tuned through two different spaced apart frequency bands with the tuning rate being linear and equal through the two bands.

It is also an object of the invention to provide a preselector of the character indicated above wherein the tunable elements of the cavity are constructed and arranged to provide a cavity of minimum length.

The foregoing and other objects are realized, in accordance with the present invention, by the provision of a preselector including only one pair of quarter-wavelength cavities. Each cavity is tuned by moving a tuning element within the cavity with the two tuning elements being driven from a common drive mechanism. The drive mechanism is actuated when the receiver is tuned from channel to channel through the two frequency bands to be covered. When the receiver is tuned from the highest frequency channel in the low band to the lowest frequency channel of the high band, the drive mechanism becomes effective to actuate a suitable device for abruptly jumping the tuning of both of the cavities. Such a device may take the form of one or more shorting bars for changing the effective length of the cavities or, alternatively, it may comprise a capacitor plate which may be turned to cause the jump in cavity tuning.

The tuning elements and the cavities are so designed and arranged that the tuning rates, that is, the change in length of the movable tuning element per unit change in the resonant frequency of the cavity, are both linear and equal in the two frequency bands. Moreover, the arrangement is such that the cavities are of minimum length but are nevertheless capable of being tuned through both of the bands to be covered. This factor, when coupled with the reduction in the total number of cavities required, permits construction of a light, compact, yet very efficient preselector.

The invention both as to its organization and manner of operation, together with further objects and advantages thereof, will best be understood by reference to the following detailed description, taken in connection with the accompanying drawings wherein.

Figure 1:
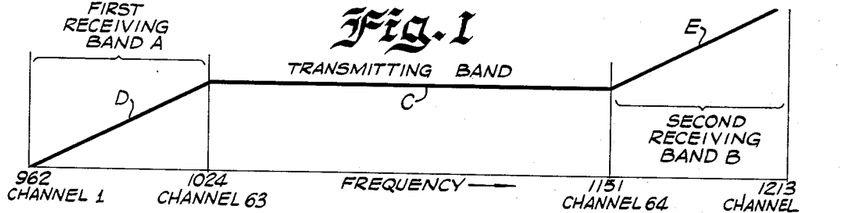
FIG. 1 is a graph which is useful in explaining the operation and construction of the preselector of the present invention.

Referring now to the drawings and first to FIG. 1, a graph is there shown which will be useful in explaining the operation of the preselector of the present invention in a tacan system. At the outset it should be recognized that the preselector of the present invention is not limited to use in tacan equipment but may also be employed in other apparatus where tuning through two or more spaced apart frequency bands is necessary. Moreover, certain features of the invention, particularly the new and improved construction of the tuning element for the cavity to minimize the cavity length and to provide a linear tuning rate, are useful even in systems where it is unnecessary to jump from one frequency band to another.

In FIG. 1 the frequency in megacycle is plotted as the abscissa while the movement of the cavity tuning element is plotted as the ordinate. The frequencies between 962 and 1024 megacycles form the first or low frequency receiving band indicated as band A while the frequencies between 1151 and 1213 megacycles form the second or high frequency receiving band indicated as band B. Since the receiving channels in the two bands are spaced one megacycle apart, it will be apparent that channels 1 to 63 fall within band A while channels 64 to 126 fall within band B. Channels 63 and 64 are separated by 127 megacycles and the transmitting band of frequencies indicated at C falls within this separation. When the receiver is tuned from channel 1 to channel 63 through band A, the preselector of the present invention functions to tune its cavities through the same band, thereby to select the proper frequencies for delivery from the aircraft antenna to the local oscillator and intermediate frequency amplifying stages of the receiver. Since the receiver is tuned in one megacycle steps, the tuning elements of the cavity must be so moved that the cavity turning rate is linear through the first band, a condition which is indicated by the straight line D in FIG. 1. When the receiver is tuned from channel 63 to channel 64 the tuning of each cavity is abruptly changed so that the same cavity or set of cavities can be used in tuning through both of the bands A and B. As the receiver is tuned from channel 64 to channel 126 the cavity tuning rate must again be linear and should equal that in the first band A. The linear tuning rate in band B is indicated in FIG. 1 by the straight line E. Equal tuning rates through bands A and B are achieved when the lines D and E have the same slope, a condition which is realized by construction of the cavities and their tuning elements in the manner described below.

Considering next the embodiment of the invention illustrated in FIGS. 2 to 8, inclusive, a preselector 20 characterized by the features of the present invention is there illustrated as comprising a pair of side-by-side quarter wavelength cavities 21 and 22 which are adapted to be tuned through the receiving bands A and B by a drive mechanism 23 to be described more fully hereinafter. The drive mechanism is enclosed within a housing 24 formed by a circular plate 25 suitably joined to a somewhat cylindrical sidewall 26 which, for ease of assembly and manufacture, may be of multiple piece construction, i.e., a pair of cylindrical sleeves 26a and 26b joined together by a mounting ring 26c. The cavities 21 and 22 are formed by a pair of tangentially arranged cylinders 27 and 28 respectively secured to flat, circular cavity bases or discs 29 and 30 both of which are mounted upon the plate 25 in a manner which will become evident as the description proceeds. The bases 29 and 30 are dimensioned to fit snugly within the lower ends of the cylinders 27 and 28 and, to provide a seat for its associated base, each cylinder may be formed with an internal, annular groove 34 at its lower end. The tops of the cavities 21 and 22 are closed by a common cover or lid 35 detachably secured by machine screws 31 to support blocks 32 and 33 affixed to the exterior walls of the cylinders. Aligned openings 36 and 37 are defined near the lower ends of the walls of the cylinders 27 and 28 to permit transfer of high frequency signals between the two cavities. To facilitate the transfer of such signals, a coupling loop 38 is affixed to the cylinder walls and extends through the aligned openings 36 and 37 to be exposed to both of the cavities 21 and 22.

Figure 2:
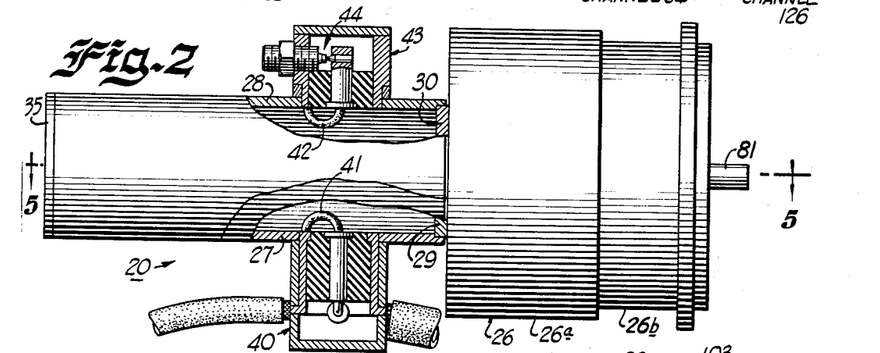
FIG. 2 is a front elevational view broken away and partly in section illustrating a preselector characterized by the features of the present invention.

Signals from the aircraft antenna (not shown) are coupled into one of the preselector cavities, for example, the cavity 21, via an input connector 40. Since this connector is of conventional construction and forms no part of the present invention, it will not be described in detail. Signals from the input connector 40 are fed into the cavity 21 through a bare conducting turn or loop 41 (FIG. 2). As indicated above, the cavity 21 is tuned to a quarter wavelength of the incoming signals and, hence, it functions as a filter to pass only signals falling within its pass band. The band width of the cavity, of course, depends upon its Q which is, in turn, a function of the cavity design. To provide further selectivity for the incoming signals the energy from the cavity 21 is coupled to the cavity 22 via the loop 38 described above. The cavity 22 is tuned to the same frequency as the cavity 21 and also functions as a filter for the incoming signals, The signal output from the cavity 22 is derived from a coupling loop 42 (FIG. 2) which supplies energy via an output connector 43 to the local oscillator and the intermediate frequency amplifying stages of the receiving equipment. As is shown on page 546 of the above-identified text by Sandretto, the connecton 43 may include a point contact type rectifier 44.

The tuning elements for adjusting the resonant frequency of the two cavities 21 and 22 are identical and, hence, only one set of these elements will be described in detail, namely, the set associated with the cavity 21. This set of tuning elements comprises a fixed tuning element in the form of a hollow column 45 and an adjustable tuning element 54 in the form of an elongated rod mounted for sliding movement within the fixed column. The fixed column 45 is provided with an annular flange or collar 46 (FIG. 5) seated within a recess 47 formed in the base 29. The lower end 48 of the column 45 is externally threaded, extends through a central opening 49 formed on the base 29 and is received within a tapped bore 50 in the plate 25. The collar 46 obviously holds the base 29 against the plate 25 when the mounting column is threaded into the opening 50, thereby mounting the elements defining the cavity 21 in fixed position upon the plate 25. The base 30 is secured to the plate 25 in similar manner. For a purpose which will become evident as the description proceeds, the upper end 51 of the column 45 is enlarged. This upper end includes an enlarged diameter recess 52 opening to a somewhat smaller diameter passage or bore 53 extending through the column 45. The movable tuning element 54 for the cavity 21 comprises an elongated rod extending through the passage 53 and secured at one end 55 to the drive mechanism 23. At its upper end, the rod is attached to an enlarged plunger 56 dimensioned to be received within the recess 52 with a spacing between its outer surface and the inner surface of the enlarged diameter portion 51 of the fixed column. Secured to the plunger 56 is a skirt 57 having a plurality of outwardly extending spring fingers thereon in engagement with the inner surface of the enlarged diameter portion 51 for the purpose of maintaining the plunger 56 centered within the recess 52, and providing electrical contact between inner surface 51 and skirt 57.

Figure 5:
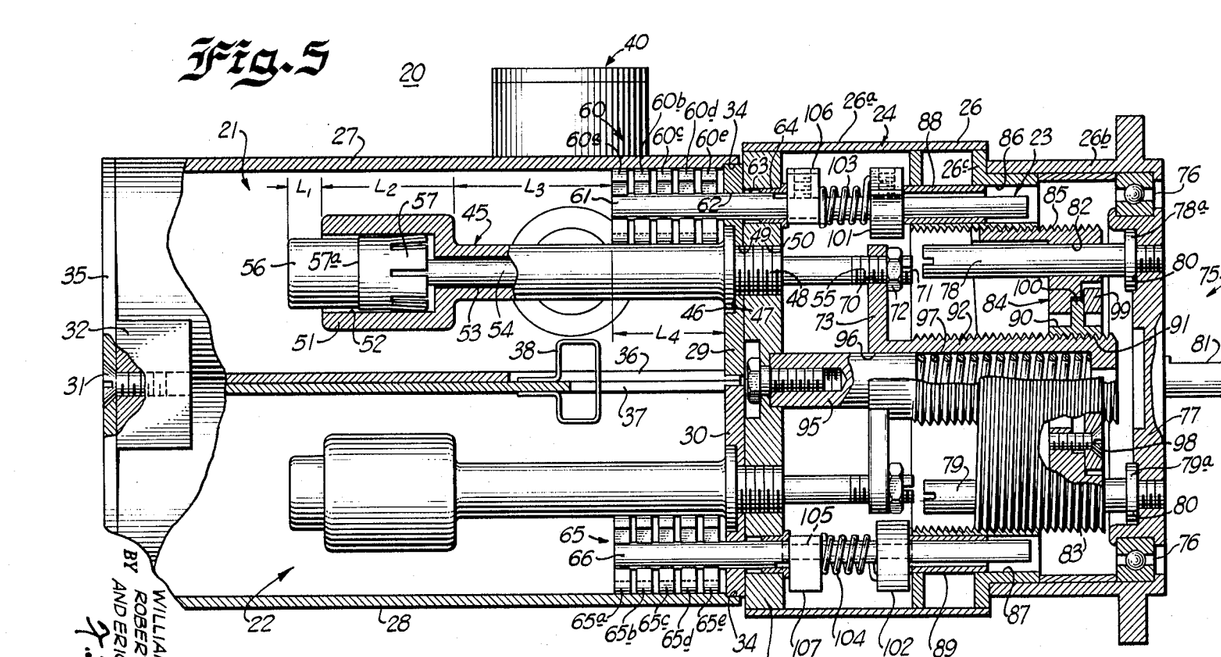
FIG. 5 is a sectional view taken along a line substantially corresponding to line 5—5 in FIG. 3.
Figure 5A:
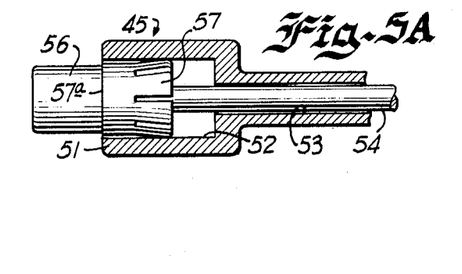
FIG. 5A is a fragmentary view showing a portion of the tuning mechanism positioned at the transition between frequency bands.

As will be well understood by those skilled in this art, the fixed tuning element 45 and the movable tuning element 54 cooperates to form an inner conductor located coaxial with the cylinder 27. The inner and outer conductors may be considered to comprise a coaxial transmission line made up of a plurality of transmission line sections $L_1$, $L_2$, $L_3$ and $L_4$ as shown in FIG. 5. The first section $L_1$ is formed by the portion of the plunger 56 which extends out of and beyond the recess 52, the second section $L_2$ is formed by the enlarged diameter portion 51 of the fixed tuning element, the third section $L_3$ includes a portion of the reduced diameter region of the fixed tuning element and the fourth section $L_4$ is formed at one end of the fixed column 45 and will be described more fully below. If the inner conductors of the four sections were of uniform diameter, the cavity would be resonant when the length of the inner conductor was one-quarter wavelength. The provision of the enlarged diameter portion 51, however, reduces the overall length of the conductor required to achieve resonance by inserting in the coaxial line a section $L_2$ wherein the inner conductor is located closer to the outer conductor than is the case with the remaining sections. This feature effectively reduces the overall length of the cavity.

Figure 5B:
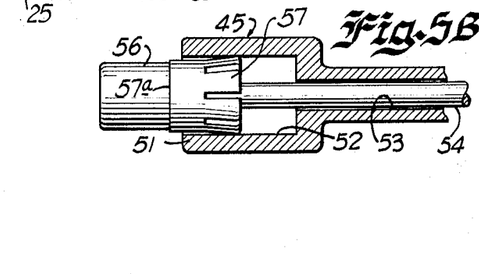
FIG. 5B is a view similar to FIG. 5A but shows the tuning mechanism in position for tuning through the high frequency band.

The movable tuning element is illustrated in FIG. 5 near the high frequency limit of the cavity so that the cavity is tuned to a frequency near the upper end of band B. The cavity may be tuned to a lower frequency by actuating the drive mechanism 23 in such manner that the movable tuning element 54 is moved to the left as viewed in FIG. 5, thereby exposing more of the plunger 56 and, hence, increasing the length of the transmission line section $L_1$. The tuning rate, that is, the change in length of the section $L_1$ per megacycle change in the resonant frequency of the cavity, is a function of the diameter of the exposed portion of the plunger 56 and the diameter of the cylinder 27. These diameters are chosen to provide equal tuning rates in both of the frequency bands A and B. More specifically, the transition from frequency band A to frequency band B takes place when the shoulder 57a between the plunger 56 and the skirt 57 lies approximately flush with the end of the enlarged diameter portion 51 of the fixed column (i.e., when the shoulder 57a is in the position shown in FIG. 5A). The change in capacitance which is required to shift the resonant frequency of the cavity is greater when tuning through band A than when tuning through band B. Therefore, if the tuning rate is to be linear through both bands the plunger 56 and the skirt 57 must be designed to introduce the required capacitance changes. In tuning through band B the skirt 57 is telescoped within the enlarged portion 51 as is shown in FIG. 5, and the movement of the plunger 56 is responsible for the capacitance changes. The diameter of the plunger 56 is thus chosen to provide the desired tuning rate in band B. When tuning through band A the skirt 57 is exposed beyond the end of the fixed column 45 as is shown in FIG. 5B and, hence, its diameter is chosen to provide the desired tuning rate through this band, i.e., to introduce the increased capacitance change required to cause a one megacycle shift in frequency in response to a given movement of the movable tuning element. Obviously, the diameters may be chosen to provide any desired tuning rate and/or to provide unequal tuning rates in the two bands. The design of the inner and outer conductors is also such that the tuning rate is linear through both bands. The use of a relatively large diameter plunger 56 and skirt 57 obviously reduces the amount of plunger movement required to effect a given change in frequency and, hence, permits a cavity construction of shorter length.

In accordance with a very important feature of the present invention, switching between the bands is accomplished in the cavity 21 by a shorting switch indicated generally by the reference numeral 60. This switch includes a plurality of spaced apart shorting bars 60a, 60b, etc. mounted upon a switch shaft 61 which extends through aligned openings 62 and 63 respectively formed in the base 29 and in the plate 25. The shaft is journalled within a suitable bushing 64 seated in the opening 63 and its free end extends into the housing 24 to be actuated by the drive mechanism 23 in a manner which will become evident as the description proceeds.

Figure 3:
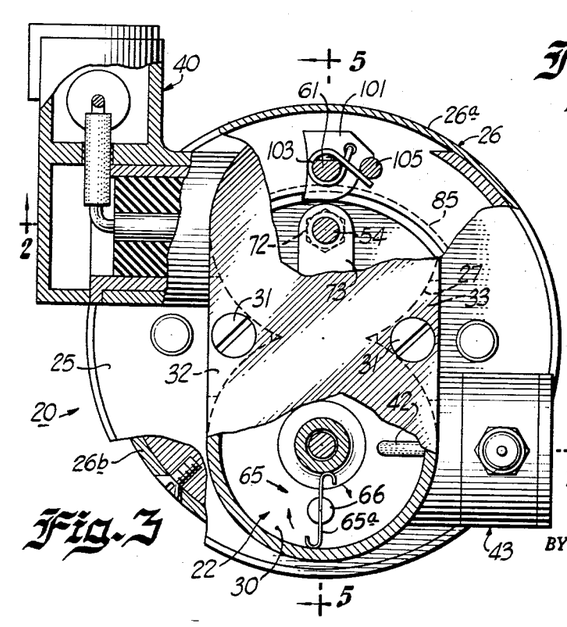
FIG. 3 is an enlarged end view broken away and partly in section showing the preselector illustrated in FIG. 2 conditioned for operation in one frequency band.

A similar shorting switch 65 is also provided for the cavity 22 and it includes a shaft 66 carrying shorting bars 65a, 65b, etc. As is shown in FIG. 3, each of the shorting bars 60a, 60b, etc. and 65a, 65b, etc. takes the form of a somewhat S-shaped spring finger of sufficient length to bridge the gap between the inner surface of the cavity cylinder and the outer surface of the small diameter portion of the fixed column in that cavity. When the cavities 21 and 22 are being tuned through the low frequency band A from channel 1 to channel 63, both sets of the shorting bars 60a, 60b, etc. and 65a, 65b, etc. are in the position shown in FIGS. 4 and 6 where their curved ends are out of engagement both with the cavity cylinder and with the fixed column. When the drive mechanism is actuated from channel 63 to channel 64, the shaft 61 is turned 90° in a clockwise direction from the position shown in FIG. 4 while the shaft 66 is turned 90° in a counterclockwise direction. The ends of the shorting bars 60a, 60b, etc. thus move to the position shown in FIG. 5 where they engage the cylinder 27 and the fixed column 45, thereby shorting out the transmission line section $L_4$, reducing the inductance of the cavity circuit and raising the resonant frequency of the cavity to jump the latter from the top of band A to the bottom of band B. In similar manner, the shorting bars 65a, 65b, etc. are moved to the position shown in FIGS. 3 and 5 in order to jump the tuning of the cavity 22. The total amount of jump introduced is, of course, a function of the position of the shorting bars on their shaft. Therefore, to adjust the total amount of jump introduced, provision is made for adjusting the positions of the shorting bars. The frequencies of the cavities at the two extremes of the jump may be controlled by adjusting the movable tuning element 54 relative to the drive mechanism. This may be accomplished by turning the element 54 to move its threaded end 55 within a tapped bore formed in a drive element or yoke 73 forming part of the drive mechanism. To facilitate the adjustment the movable tuning element 54 may be provided with a slot 71 at one end for receiving a screw-driver or similar adjusting tool. A lock nut 72 is preferably employed to lock the tuning element in position after it has been properly adjusted to establish the desired operating frequencies.

The drive mechanism 23 includes a drive assembly 75 journalled for rotation within the sleeve 26b by means of roller bearings 76. The drive assembly 75 includes a support plate 77 carrying a pair of studs 78 and 79 which extend into the housing 24. The studs may be secured to the plate 77 in any suitable manner as, for example, by threading their ends into tapped bores in the plate 77 until fixed collars 79a seat within recesses 80 formed in the plate. Secured to the center of the plate 77 and extending axially outward therefrom is a drive shaft 81 which is turned as the receiver (not shown) is tuned from channel to channel. The receiver tuning mechanism is, therefore, connected through appropriate gearing or the like to the shaft 81. The studs 78 and 79 extend loosely through bores 82 and 83, respectively, which are formed in a somewhat cup-shaped drive member 84. The latter member includes an externally threaded sleeve portion 85 in engagement with the internally threaded mounting ring 26c. The latter ring is provided with diametrically opposed bores 86 and 87 extending parallel to each other and to the axis of the ring for the purpose of accommodating guide sleeves 88 and 89 which receive and support the free ends of the shafts 61 and 66, respectively (see FIG. 5).

As the drive assembly 75 is rotated by turning the shaft 81, the drive member 84 is threaded into or out of the ring 26c. The member 84 is, in turn, connected to a drive ring 90 which has an internally threaded through passage 91 therein for receiving the externally threaded shank 92 of the yoke 73 referred to above. Thus, when the member 84 is rotated, the ring 90 turns with it and is threaded onto or off of the shank 92. The yoke 73 cannot turn because it is connected in the manner described above to the movable tuning elements 54 of both of the cavities 21 and 22, and, hence, this yoke is moved axially to the left or to the right (depending, of course, upon the direction of drive of the assembly). The axial movement of the yoke 73 is accompanied by corresponding axial movement of the tuning elements 54 of both cavities so that the latter are tuned to a frequency corresponding to the position of the drive shaft 81. The yoke 73 is guided in its axial movement by a stud 95 attached to the plate 25 and extending into an axial recess 96 formed in the shank 92. A compression spring 97 seated within the recess 96 acts between the stud 95 and the yoke 73 so that the latter is biased to the right as viewed in FIGS. 5 and 6.

Figure 7:
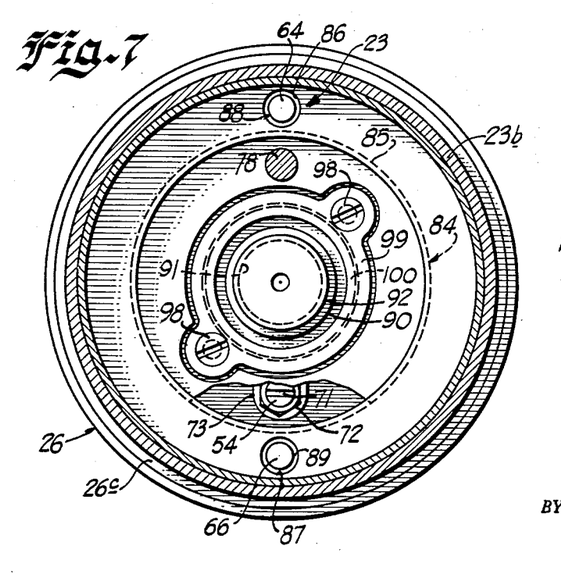
FIG. 7 is a sectional view, broken away and taken along a line substantially corresponding to the line 7—7 in FIG. 6 assuming, of course, that the latter shows the entire structure.

The connection between the member 84 and the ring 90 is effected by means of a clamping plate 99 which is attached to the drive member 84 by means of a plurality of spaced screws 98 threaded into tapped bores defined in the drive member (see FIG. 7). The clamping plate 99 clamps a radially extending flange 100 on the ring 90 against the member 84 and, hence, provides a rigid but adjustable connection between these components. Thus, the tuning may be adjusted by loosening screws 98 and turning the shank 92 within the ring 90. Following the adjustment, the screws 98 are again tightened.

Figure 6:
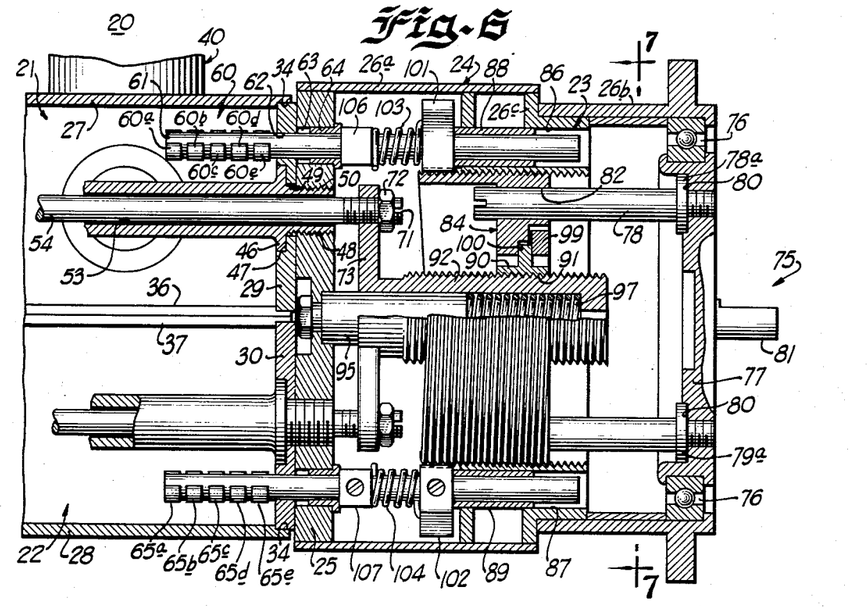
FIG. 6 is a fragmentary, sectional view similar to FIG. 5 but shows the preselector conditioned for operation in the same frequency band as shown in FIG. 4.
Figure 8:
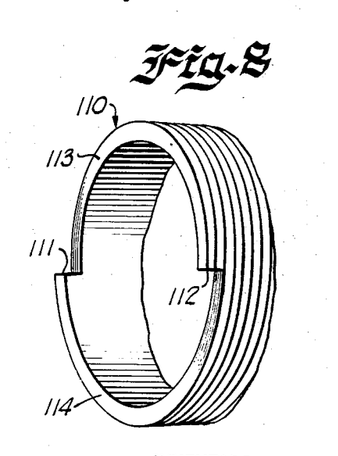
FIG. 8 is a fragmentary, isometric view illustrating the camming end of the drive element employed in the preselector shown in FIGS. 2 to 7, inclusive.

In view of the foregoing description it will be recognized that rotation of the shaft 81 as the receiver is tuned from channel 126 to lower frequency channels causes the member 84 to move towards the left as viewed in FIGS. 5 and 6, thus moving this member from the high frequency tuning position shown in FIG. 5 towards the low frequency position shown in FIG. 6. This movement of the member 84 is, of course, accompanied by similar movement of the movable tuning elements 54 of both of the cavities 21 and 22. The shorting switches 60 and 65 are maintained in the position shown in FIGS. 3 and 5 until the shaft 81 reaches a position corresponding to channel 64. This is accomplished by cam followers or pawls 101 and 102 which are respectively secured to end portions of D-shaped cross section of the shafts 61 and 62. These cam followers are seated against the guide sleeves 88 and 89 and are normally biased to turn in a clockwise direction as viewed in FIG. 3. This biasing is effected by torsion springs 103 and 104 each of which has one end inserted through an opening in its associated cam follower (see FIG. 3) and has its other end acting against a fixed pin 105 mounted between the plate 25 and the ring 26c. Stop collars 106 and 107 respectively mounted on the shafts 61 and 62 cooperate with the pins 105 to limit the clockwise movement of the cam followers 101 and 102 as is shown in FIG. 3. When the drive mechanism 23 is positioned to tune the cavities 21 and 22 through the high frequency band B, the cam followers are biased against the stop pins and occupy the position shown in FIG. 3 where, as indicated above, the shorting switches are effective to short out portions of the cavities. When the drive mechanism moves from channel 64 to channel 63, the end of the drive member 84 engages and turns both of the cam followers 101 and 102 against the action of the biasing springs. This is accomplished by providing on the drive member 84 a cam end 110 shaped as shown in FIG. 8. This cam end includes a pair of equal steps 111 and 112 having their tips lying in a common plane extending perpendicular to the axis of the member 84. These steps are connected by inclined or gradually tapering faces 113 and 114 having a helical back profile which matches the lead on the threads of the sleeve portion 85. When the drive mechanism 23 is driven from channel 126 to channel 64, the cam end 110 is at the right (as viewed in FIG. 5) of the cam followers 101 and 102 but it is gradually approaching these followers. When the tuning is shifted from channel 64 to channel 63, the drive member 84 turns slightly and moves to the left so that the steps 111 and 112 engage the cam followers 101 and 102 and rotate them through an angle of 90° against the action of the biasing springs 103 and 104 until the followers are seated upon the externally threaded sleeve portion 85 of the member 84. The movement of the cam followers to the latter position is accomplished during a very small angular movement of the drive member 84 and in the embodiment shown in FIGS. 2 to 8 it is accomplished in about 5° of rotation of the drive assembly. The turning of the cam followers 101 and 102 through an angle of 90° moves the shorting switches 60 and 65 from the positions shown in FIG. 5 to those shown in FIG. 6, thereby jumping the resonant frequency of the cavities to the high frequency end of the low band A in the manner previously described. The cam followers 101 and 102 obviously remain seated upon the sleeve portion 85 as the receiver is tuned through band A from channel 63 to channel 1.

Figure 4:
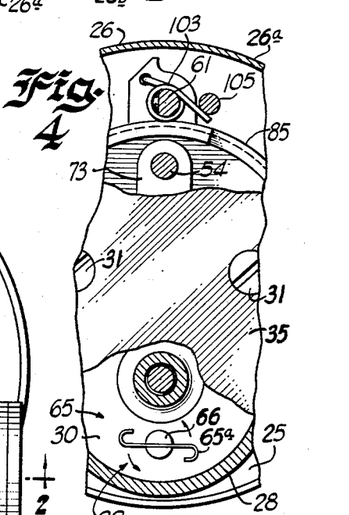
FIG. 4 is a fragmentary, sectional view similar to FIG. 3 but shows the preselector conditioned for operation in the other frequency band.

When the drive mechanism 23 is driven in the reverse direction in tuning from channel 1 to channel 63, the cam followers 101 and 102 are held in the position shown in FIGS. 4 and 6 so that the shorting switches 60 and 65 are off. In changing from channel 63 to channel 64, the drive member 84 moves out of engagement with the cam followers and, hence, the springs 103 and 104 become effective to turn the shafts 61 and 66 until the stop collars 106 and 107 engage the pins 105. The shorting switches 60 and 65 are thus rendered effective to jump the resonant frequency of the cavities from the high end of the low band A to the low end of band B. The shorting switches remain in this position as the receiver is tuned from channel 64 to channel 126.

Figure 9:
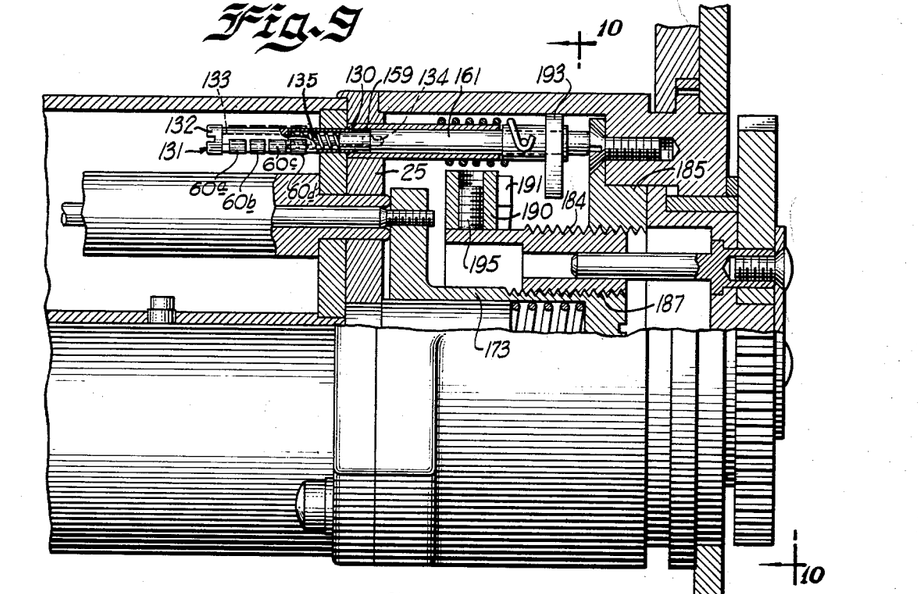
FIG. 9 is a fragmentary, front elevational view, partly in section illustrating another embodiment of the preselector of the present invention.
Figure 10:
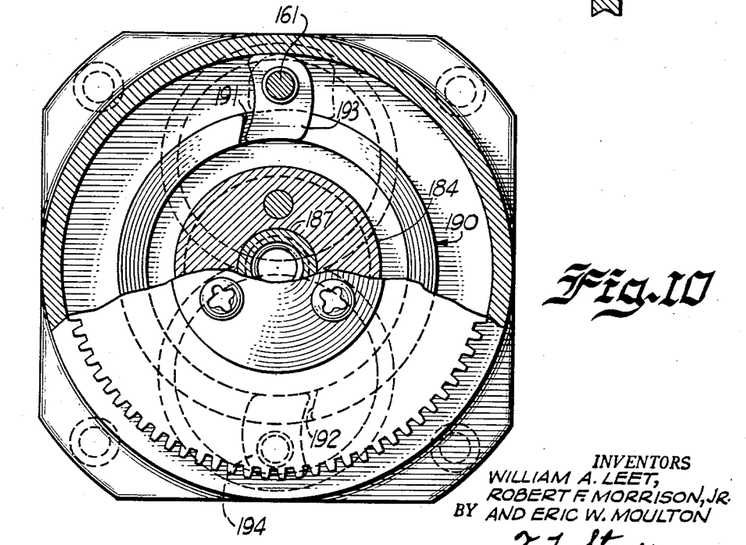
FIG. 10 is a sectional view taken along a line substantially corresponding to the line 10—10 in FIG. 9 assuming, of course, that the latter shows the entire structure.

A second form of the preselector of the present invention is shown in FIGS. 9 and 10 with the principal difference between this embodiment and that shown in FIGS. 2 to 8, inclusive, residing in the camming mechanism for actuating the shorting switches and in the use of an adjustable mounting for the shorting bars of the shorting switch. More specifically, the shorting bars 60a, 60b, etc are mounted upon a hollow sleeve 130 which is telescopically mounted upon a reduced diameter portion 159 of the switch shaft 161. An adjusting screw 131 having an enlarged head 132 seated against the end of the sleeve 130 is provided with an elongated threaded shank 133 for reception within a tapped axial passage 134 in the shaft 161. A compression spring 135 encircles the shank 133 and acts between the end of the shaft 161 and the sleeve 130 to bias the latter towards the left as viewed in FIG. 9. As the adjusting screw 131 is turned the sleeve 130 is moved upon the reduced diameter portion 159 thus adjusting the position of the shorting bars 60a, 60b, etc. within the cavity. As was indicated above, the described adjustment is effective to control the total frequency jump introduced when the shorting switch is thrown from one position to another.

The drive mechanism shown in FIG. 9 is very similar to that described above, the principal difference residing in the construction of the threaded drive member 184. In the form of the invention shown in FIG. 9 the member 184 is threaded both externally and internally thus providing a one piece construction to replace the multiple piece (84, 90, 98, 99) construction previously described. The drive member 84 also carries a cam ring 190 having thereon a pair of spaced apart cam projections 191 and 192 (FIG. 10). The preselector is shown in FIG. 9 near its low frequency limit with the movable tuning element almost fully extended from the fixed tuning element. When the drive assembly is turned to tune the receiver through band A from channel 1 to channel 63, the drive member 184 threads into the ring 185 and moves to the right as viewed in FIG. 9. At the same time, the internal threads 186 on the drive member move the drive yoke 173 to the right to draw the movable tuning elements of the cavities into the fixed tuning elements, thus raising the resonant frequency of the cavities. When the drive mechanism shifts from channel 63 to channel 64, the cam projections 191 and 192 engage and turn cam followers 193 and 194 to actuate the shorting switches and, hence, to jump the cavity tuning in the manner previously indicated. The construction shown in FIG. 9 has the advantage that, by loosening a set screw 195, the cam ring 190 can be adjusted both axially and radially of the drive member 184 in order to make certain that the shorting switches are actuated at exactly the right time, i.e., in switching from channel 63 to channel 64.

The two embodiments described above may be described as employing "double thread" drive arrangements since the drive member (or a member secured thereto) is provided with both external and internal threads. Such an arrangement provides relatively large rotary movement of the drive member (84 or 184) for a given linear movement. This large rotary movement permits the cam followers to be actuated while the drive mechanism is changed through only one channel. It has been found that the double thread arrangement provides 30° or more rotary movement of the drive member (84 or 184) for each channel and this large angular movement permits the cam followers to be actuated at the proper time (i.e., in switching from channel 63 to 64) without at the same time requiring excessively rigid mechanical tolerances.

Figure 11:
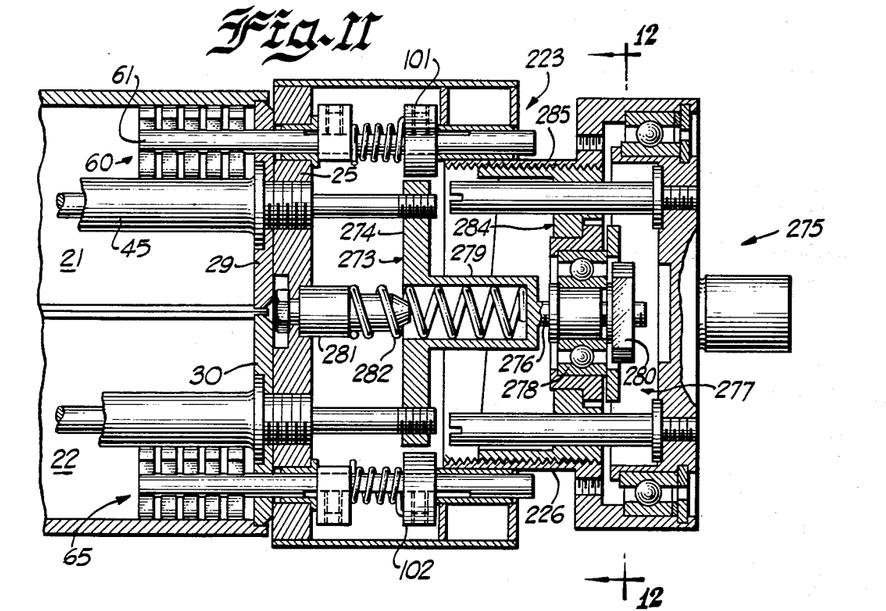
FIG. 11 is a fragmentary, sectional view illustrating still another embodiment of the preselector of the present invention.
Figure 12:
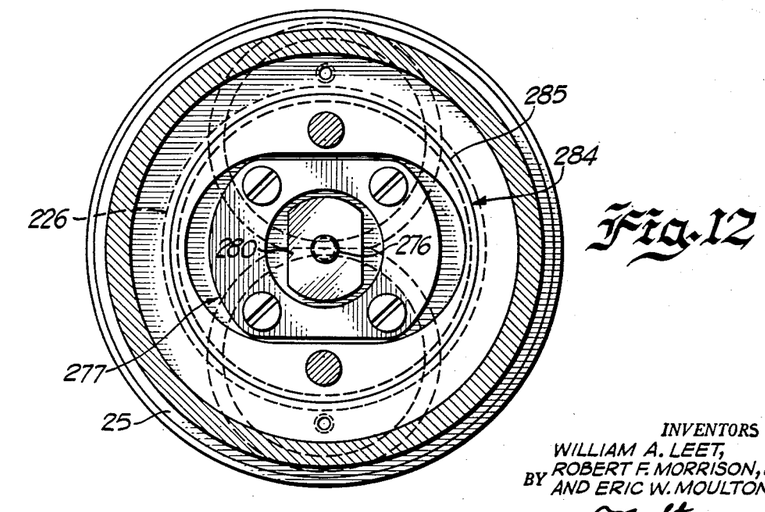
FIG. 12 is a sectional view taken along a line substantially corresponding to the line 12—12 in FIG. 11 assuming, of course, that the latter shows the entire construction.
Figure 13:
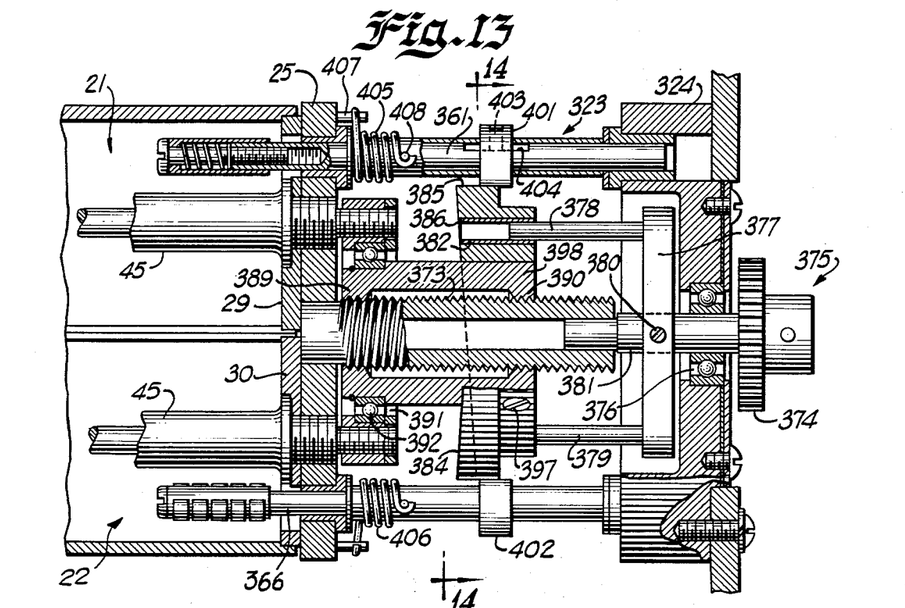
FIG. 13 is a fragmentary, sectional view illustrating a still further embodiment of the preselector of the present invention.
Figure 14:
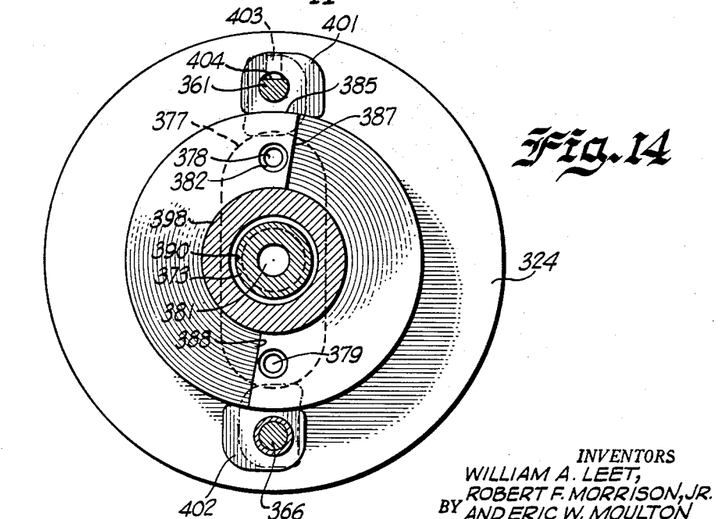
FIG. 14 is a sectional view taken along a line corresponding substantially to the line 14—14 in FIG. 13 assuming again that the latter shows the entire structure.

The embodiment of the invention shown in FIGS. 11 and 12 and that shown in FIGS. 13 and 14 may be referred to as "single thread" arrangements because the drive member employed in each of these embodiments has only one set of threads. This produces a structure which is somewhat simpler mechanically than the "double thread" embodiments shown in FIGS. 2 to 8 and in FIGS. 9 and 10. Considering next the arrangement shown in FIGS. 11 and 12, it will be observed that the preselector there shown includes a pair of cavities 21 and 22 identical in construction with the correspondingly numbered cavities previously described in conjunction with the embodiment shown in FIGS. 2 to 8. Each of these cavities includes fixed and movable tuning elements and a shorting switch like those described above.

The drive mechanism shown in FIGS. 11 and 12 is designated by reference numeral 223 and, as was indicated above, it differs from the drive mechanism 23 previously described primarily by the provision of a drive member 284 having a single set of threads 285 thereon. These threads mesh with the internal threads formed on a fixed mounting ring 226 so that the drive member 284 moves axially when it is turned by a drive assembly 275 which will not be described in detail since it is very similar to the assembly 75 previously considered. The axial movement of the drive member 284 as it is threaded into or out of the ring 226 is accompanied by corresponding axial movement of a drive yoke 273 which is secured to the movable tuning elements of both cavities. The drive yoke 273 does not turn with the drive member but is free to move toward or away from the base plate 25. This drive yoke includes a circular plate-like portion having at its center a hollow hub 279 which forms a cylinder having one open end and one closed end. A threaded stub 276 extends axially outward from the center of the closed end of the hub 279 to support suitable means 277 for connecting the drive element 273 to the drive member 284. The latter means includes a bearing assembly 278 which is held in position on the stub 276 by means of a lock cap 280 and which transmits thrust to the yoke 273. Thus, the connecting means 277 permits the drive member 284 to turn with respect to the drive yoke 273 but at the same time causes the axial movement of the member 284 to be transmitted to the yoke 273 in order to adjust the tuning of the cavities in the manner described above. A guide stud 281 secured to the plate 25 and extending into the open end of the hub 279 supports a compression spring 282 which normally biases the drive element 273 towards the right as viewed in FIG. 11.

The shorting switches 60 and 65 are actuated by engagement of the cam end of the drive member 284 with cam followers 101 and 102. The cam end of the member 284 is like the end of the member 84 shown in FIG. 8 and, hence, the manner in which the shorting switches are rendered effective to jump the cavity tuning will be obvious from the foregoing description.

Turning now to the single thread arrangement shown in FIGS. 13 and 14, it will be observed that the preselector there shown again comprises a pair of cavities 21 and 22 identical in construction to the correspondingly numbered cavities previously described and including a fixed tuning element or column 45 having a movable tuning element slidable therein. The shorting switches for jumping the tuning of the cavities 21 and 22 are illustrated as being of the type shown in FIG. 9 wherein the shorting bars are adjustable in order to control the total amount of jump in cavity tuning introduced by the switches. Since a similar adjusting arrangement has been described above in connection with the form of the invention shown in FIG. 9, the operation will be obvious.

The drive mechanism illustrated in FIG. 13 is identified by the reference numeral 323 and includes a drive assembly 375 which is somewhat similar to the assembly 75 previously described. More specifically, the drive assembly 375 includes a shaft 381 which is adapted to be driven via a gear 374 from the tuning mechanism of the receiver. A plate or disc 377, which is secured to the shaft 381 through a set screw 380, supports a pair of studs 378 and 379. The shaft 381 is mounted for rotation with respect to the fixed frame or housing 324 by means of roller bearings 376 and has its inner end accommodated within an externally threaded sleeve or stud 373 secured in any suitable manner to the base plate 25.

The studs 378 and 379 extend into cylindrical sleeves 382 which are, in turn, disposed within appropriate openings or bores defined in a drive member 384. The latter drive member includes a cam end 386 having two raised steps or projections 387 and 388 thereon for actuating the shorting switches for the two cavities. As will be described below, the smooth external surface 385 of the drive member 384 serves to maintain the shorting switches in their "off" positions when the two cavities 21 and 22 are being tuned through the low frequency band A. The drive member 384 is secured by means of a set screw 397 to a sleeve 398 having a pair of spaced apart, inwardly extending, internally threaded flanges 389 and 390 in engagement with the stud 373. Thus, as the drive assembly 375 is turned when the receiver tuning is adjusted, the drive member 384 and the sleeve 398 are threaded onto or off of the fixed stud 373. The axial movement of the sleeve 398 is transmitted to the movable tuning elements of the cavities 21 and 22 by suitable connecting means 391 interposed between the sleeve 398 and the ends of the movable tuning elements. This connecting means may include bearings 392 which permit rotation of the sleeve 398 with respect to the movable tuning elements but, at the same time, transmit the thrust.

The preselector illustrated in FIG. 13 is shown in its low frequency position near the bottom of band A with the movable tuning elements of both cavities extended or exposed. When the receiver is tuned from the low frequency end of band A to the high frequency end of this band, the sleeve 398 and the drive member 384 move to the right as viewed in FIG. 13, thus retracting the movable tuning elements of the cavities and changing the resonant frequency of these cavities in the manner indicated above. During tuning of the receiver through the low frequency band, the shorting switches of both cavities are maintained in their "off" positions illustrated by the solid lines in FIG. 14. More specifically, the drive member 384 is effective during tuning through the low frequency band to engage cam followers 401 and 402 respectively carried by the shorting switch shafts 361 and 366. The latter cam followers may be secured to the shorting switch shafts in any suitable manner as, for example, by means of set screws 403 which engage flattened portions 404 on the shafts. The cam followers 401 and 402 are normally biased to turn in a clockwise direction (FIG. 14) by means of torsion springs 405 and 406 each of which acts between a fixed pin 407 attached to the plate 25 and a pin 408 on the shorting switch shaft. Thus, the springs 405 and 406 normally bias the cam followers 401 and 402 toward the broken line positions shown in FIG. 14. During tuning through the low frequency band, however, the smooth outer surface portion 385 of the drive member engages the cam followers 401 and 402 to hold them in their solid line positions shown in FIG. 14 against the action of the biasing springs 405 and 406. Thus, the shorting switches for the two cavities are both maintained in their "off" positions. When the receiver tuning is changed from channel 63 to channel 64, the two projections 387 and 388 move out from under the cam followers 401 and 402 so that the biasing springs 405 and 406 become effective to pivot the cam followers to their broken line positions illustrated in FIG. 14 whereupon the shorting switches become effective to jump the tuning of the cavities in the manner described above.

When the receiver is turned from channel 64 to channel 126 the shorting switches obviously remain in their "on" positions while the movable tuning elements of the two cavities are further retracted into the fixed columns.

Another form of a preselector characterized by the features of the present invention is illustrated in FIGS. 15 to 19, inclusive. The preselector there shown, like those previously described, may comprise a pair of resonant cavities disposed side-by-side with the energy being coupled between the cavities but, to simplify the explanation, only one of these cavities is illustrated. This cavity is defined by a sidewall 500 secured to top and bottom walls 501 and 502. The cavity is tuned by a plunger 503 having an externally threaded portion 504 in engagement with an internally threaded bushing 505 affixed to the bottom wall 502. The plunger 503 carries a gear 506 which meshes with an elongated, longitudinally threaded gear 507 driven from the receiver tuning mechanism. Thus, as the receiver is tuned between the various channels described above the portion 504 is threaded into or out of the bushing 505 in order to move the plunger 503 within the cavity, thereby causing the resonant frequency of the cavity to correspond with the frequency to which the receiver is tuned.

Figures 15, 16, 17, 18, 19:
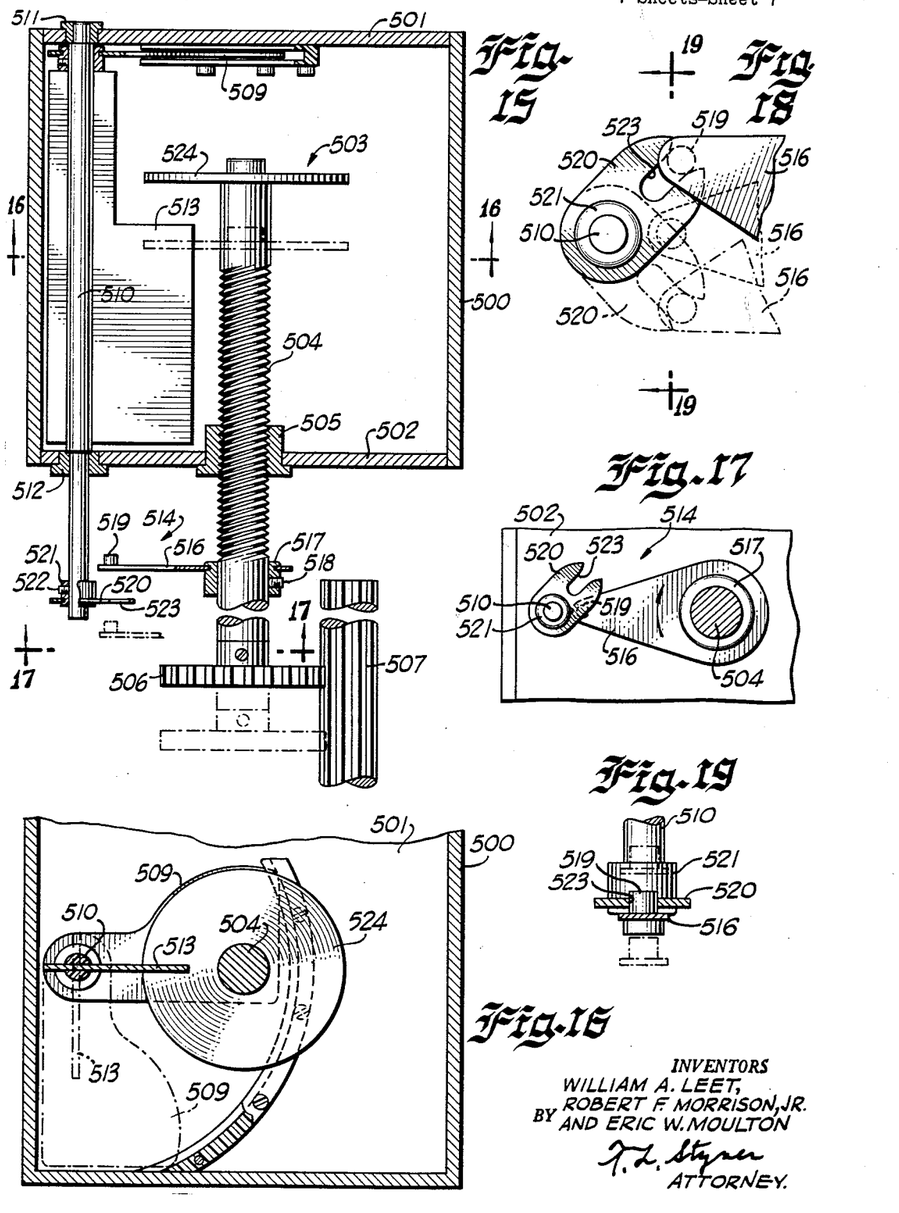
FIG. 15 is a sectional view illustrating a further embodiment of the preselector of the present invention.
FIG. 16 is a fragmentary, sectional view looking in the direction of the arrow-pointed lines 16—16 in FIG. 15 and shows a capacitor for use in jumping the tuning of the cavity from one frequency to another.
FIG. 17 is a fragmentary, sectional view taken along lines 17—17 in FIG. 15 and shows a mechanical arrangement for shifting the capacitor plate.
FIG. 18 is an enlarged, fragmentary view of a portion of the mechanical arrangement shown in FIG. 17 with the solid lines indicating the position of the elements in one mode of operation and the broken lines indicating the position of the parts in the other mode of operation.
FIG. 19 is a sectional view taken along a line substantially corresponding to line 19—19 in FIG. 18 again showing the parts in the two modes of operation.

The cavity is adapted to be tuned through both of the frequency bands A and B and mechanism is again provided for jumping the tuning from one band to the other when switching between channels 63 and 64. This mechanism takes the form of a capacitor plate 509 which is mounted upon an insulating rod 510 extending through the cavity. The latter rod is supported at one end by a bushing 511 mounted within the top wall 501 and its other end extends through a bushing 512 in the bottom wall. The rod 510 also carries a metal compensating plate or paddle 513, the purpose of which will be explained hereinafter.

A mechanical movement indicated generally by the reference numeral 514 is employed to turn the insulated rod 510 in order to render the capacitor plate 509 and the compensating paddle 513 effective to jump the cavity tuning from one band to the other. While this mechanical movement may take a number of forms well known in the art, it is illustrated as comprising a drive arm 516 mounted upon a collar 517 detachably secured to the plunger 503 as, for example, by means of a set screw 518. The drive arm 516 carries a finger 519 at its free end for engagement with a pawl 520 mounted on a collar 521 which is secured to the insulated rod 510 by means of a set screw 522. The pawl 520 includes a slot 523 for receiving the finger 519, the slot being so shaped and dimensioned that the pawl is turned through an angle of 90° when rotated by the drive arm 516.

The preselector is shown in FIGS. 15 and 16 in condition for operation in the low frequency band A. To tune through this band from channel 1 to channel 63 the gear 506 and the plunger 503 are driven in a counterclockwise direction as viewed in FIG. 17, thus gradually withdrawing the plunger 503 from the cavity to decrease the resonant frequency. During tuning through the low band A, the capacitor plate 509 and the compensating plate 513 are in the positions illustrated in FIG. 15. The capacitor plate 509 lies above a flat plate 524 carried by the plunger and cooperates with this disc to introduce capacity into the cavity to effectively reduce the resonant frequency. The drive arm 516 obviously turns with the plunger 503 and at a preselected point in the plunger movement, i.e., when the cavity is tuned to the high end of band A, the drive arm 516 reaches the position shown in broken lines in FIG. 18 where it is about to enter the slot 523 in the pawl 520. As the drive arm turns from this position to the position shown in solid lines in FIG. 18, i.e., in switching from channel 63 to channel 64, the finger 519 passes into the slot 523 and rotates the pawl through an angle of 90°. The pawl 520, of course, turns the rod 510 to move the capacitor plate 509 out of alignment with the flat plate 524 on the tuning plunger 503 and to the position indicated in broken lines in FIG. 16. The turning of the plate 509 to the broken line position reduces the extra capacity of the cavity and shifts the resonant frequency to the lower end of the high band B. To this end, the capacitor plate is dimensioned and shaped to introduce the frequency shift desired and, in the tacan installation described above, it introduces a 126 megacycle shift. After the pawl has been turned slightly beyond the position shown in solid lines in FIG. 18, the finger 519 leaves the slot 523 and the drive arm 516 moves past the pawl 520 to permit further movement of the plunger 503 in tuning the cavity through the high band B.

Since the length of the tuning plunger varies according to the tuning law function:

$$L = \tan^{-1}\left(\frac{1}{fCZ_0}\right)$$

where L is the effective plunger length, C is the capacity from the plate 524 on the plunger and $Z_0$ is the characteristic impedance of the cavity, the introduction of additional capacity when the plate 509 is in the position shown in solid lines in FIG. 16 requires that some compensation be made to correct the tuning law while the cavity is being tuned through the low band. This compensation is provided by the compensating plate 513 which is turned with the capacitor plate 509. When the compensating plate is in the position shown in FIG. 15 (and the solid line position shown in FIG. 16), it induces relatively large eddy currents and effectively lowers the characteristic impedance of the cavity. The paddle 513 is shaped and dimensioned to change the characteristic impedance by the exact amount necessary to compensate for the additional capacity introduced when the capacitor plate 509 is in its low frequency band position. When the capacitor plate 509 and the compensating plate 513 are in their high frequency band positions (shown in broken lines in FIG. 16), the paddle 513 is oriented perpendicular to the field between the inner and outer conductors of the cavity so that very little eddy current is induced and the characteristic impedance of the cavity is, therefore, increased over that in the low frequency band.

When the plunger 503 is turned in the reverse direction, i.e., in a clockwise direction as viewed in FIG. 17, to decrease the resonant frequency of the cavity from the high end of band B, it is threaded into the bushing 505 to move into the cavity. The drive arm will reach a position (in shifting from channel 64 to channel 63) where the finger 519 enters the slot 523 to turn the pawl 520 from the position shown in solid lines in FIG. 18 to that shown in broken lines. At this time the capacitor plate 509 and the compensating plate 513 are turned to the positions shown in solid lines in FIG. 16. The capacitor plate 509 is thus moved to a position where it overlies the plate 524 of the plunger 503, thereby increasing the capacity and shifting the resonant frequency of the cavity to the upper end of the low frequency band A. At the same time, the compensating plate 513 is turned so that it lies in the direction of the field between the inner and outer conductors of the cavity. The finger 519 emerges from the slot 523 as the cavity is tuned from the upper end of the low frequency band A and the drive arm 516 is then free to pass inwardly towards the cavity from the solid line position shown in FIG. 19 to the broken line position L. Thus, further turning of the plunger 503 in a clockwise direction, as viewed in FIG. 17, tunes the cavity through the low frequency band A from channel 63 through channel 1. An arcuate guide track 525 is secured to the top wall 501 to support and guide the end of the capacitor plate 509 as the latter is turned.

The positions of the pawl 520 and/or the drive arm 516 may be adjusted to make certain that the jump in tuning takes place at exactly the right time, that is, in shifting between channels 63 and 64. This adjustment is, of course, accomplished by loosening the set screws 518 and/or 522 and thereafter moving the pawl and/or the drive arm until the desired position is attained.

In view of the foregoing description it will be observed that all of the described embodiments of the invention result in a preselector wherein the number of tuned cavities is reduced. In all cases the cavity is tuned through a pair of spaced apart frequency bands by a continuous drive system, the shift in cavity tuning between the two bands being accomplished automatically during the continuous drive.

While particular embodiments of the invention have been shown, it will be understood, of course, that the invention is not limited thereto since many modifications may be made and it is, therefore, contemplated by the appended claims to cover any such modifications as fall within the true spirit and scope of the invention.

What is claimed as new and desired to be secured by Letters Patent of the United States is:

1. A cavity tunable through at least two discontinuous frequency bands comprising means defining the cavity, means including a movable tuning element within said cavity for continuously adjusting the resonant frequency of the cavity through both of the frequency bands, said frequency adjusting means comprising a fixed tuning post element extending into said cavity and having a movable tuning element on the inner end of the post, means within said cavity for shifting the resonant frequency of the cavity from one band to the other at a predetermined point in the movement of said tuning element, the shifting means comprising a shorting switch for electrically connecting said post to the cavity wall a predetermined distance from one end of said post in order to shift the resonant frequency of the cavity from one frequency band to the other, and means for operating said frequency shifting means in response to movement of said tuning element to said predetermined position of said tuning element.

2. The apparatus defined by claim 1 wherein the shorting switch comprises a plurality of resilient fingers disposed side-by-side in a line parallel to said conductors and movable in unison from a first position wherein they do not engage either of said post and said cavity wall to a second position where they provide the electrical connection between the said post and said cavity wall.

3. The apparatus defined by claim 2 wherein means are provided for adjusting, in a direction longitudinally of said post, the positions of said fingers within said cavity in order to control the total frequency shift introduced when said fingers are moved between said first and second positions.

4. A cavity tunable through at least two discontinuous frequency bands and comprising means defining a tubular cavity, means including a movable tuning element within said cavity for adjusting the resonant frequency of said cavity, said tuning element comprising an extendible post, drive means for smoothly changing the length of said post to tune said cavity through said bands, means actuated by said drive means for shifting in one step the resonant frequency of the cavity from one of said two bands to the other of said two bands, said drive means including mechanism for driving said movable tuning element, means engageable by said mechanism when said tuning element reaches a predetermined point in the movement of said tuning element for actuating said shifting means, and said mechanism including a cam, engageable with said shifting means at said predetermined point in the movement of the tuning element.

5. The apparatus defined by claim 4 wherein an adjustable connecting means is provided between said tuning element and the drive means to permit adjustment of the resonant frequency of said cavity at the extremes of the frequency shift introduced by said shifting means.

6. The apparatus defined by claim 4 wherein the drive means includes a rotatable drive assembly connected to turn a drive member threadedly engaging a fixed element so that said drive member moves axially of said fixed element when said drive member is turned, and means for transmitting the axial movement of the drive member to the tuning element.

7. In a system for continuously tuning a resonant cavity which is operative in two different frequency bands, the combination comprising a fixed tuning element disposed coaxially within the cavity and comprising a column having a predetermined outside diameter and having an elongated passage therethrough and also having an enlarged diameter portion at one end to increase capacity coupling to the cavity wall and to decrease the length of the cavity, means defining in said portion a cylindrically shaped recess having a diameter greater than that of said passage, and a movable tuning element including a rod extending through said passage and an enlarged plunger on said rod mounted for movement into and out of said recess to adjust the tuning of said cavity, said plunger and said cavity having their diameters so related that corresponding movements of said plunger provide corresponding changes in the tuning of said cavity in both said bands.

8. High frequency tuner apparatus operative in two frequency bands comprising, in combination, means forming a cylindrically shaped cavity, a fixed tuning element disposed coaxially within the cavity and comprising a column having an elongated passage therethrough and also having an enlarged diameter portion at one end, means defining in said portion a cylindrically shaped recess having a diameter greater than that of said passage, and a movable tuning element including a rod extending through said passage, and an enlarged, cylindrical plunger on said rod mounted for movement within said recess to adjust the tuning of said cavity, the diameter of said plunger being so related to the diameter of the cavity that the tuning rate of the cavity is equal and linear through its frequency range in both of said bands.

9. A tunable resonant cavity comprising
 (a) a hollow body defining said cavity,
 (b) a post mounted on said body and in said cavity,
 (c) said post having a passage extending longitudinally therethrough,
 (d) a movable tuning element including a rod disposed in said passage and extending therethrough,
 (e) a plunger on the end of said rod and movable into and out of said passage and respectively out of and into said cavity,
 (f) said plunger having two portions, one of said portions being of larger maximum diameter than the other of said portions defining a shoulder therebetween, and
 (g) said portion of larger diameter flaring from said shoulder to define a skirt whereby the tuning rate of said plunger changes when said shoulder moves from said passage and into said cavity and into said passage from said cavity.

10. The tunable cavity defined in claim 9 further comprising means for operating said cavity in two discontinuous frequency bands a shorting switch disposed between said post and said cavity wall for selectively short-circuiting the post to the wall at a predetermined distance from one end of said post for providing a jump in the resonant frequency of said cavity between said bands, common drive means for said switch and said rod, and means for finely adjusting said predetermined distance to control the magnitude of said jump in the resonant frequency when said switch is closed.

References Cited in the file of this patent

UNITED STATES PATENTS

| | | |
|---|---|---|
| 2,301,163 | Koch | Nov. 3, 1942 |
| 2,483,419 | Karmin | Oct. 4, 1949 |
| 2,594,037 | Landon | Apr. 22, 1952 |
| 2,603,754 | Hansen | July 15, 1952 |
| 2,618,167 | Seifert | Nov. 18, 1952 |
| 2,666,904 | Johnson | Jan. 19, 1954 |
| 2,688,122 | Edson | Aug. 31, 1954 |
| 2,752,576 | Hilliard | June 26, 1956 |
| 2,774,044 | Silvey et al. | Dec. 11, 1956 |
| 2,860,248 | Lyman | Nov. 11, 1958 |
| 2,862,191 | MacDonald et al. | Nov. 25, 1958 |
| 2,897,364 | Farmer | July 28, 1959 |
| 2,934,645 | Dyke | Apr. 26, 1960 |